US012436619B1

(12) United States Patent
Avvaru et al.

(10) Patent No.: US 12,436,619 B1
(45) Date of Patent: Oct. 7, 2025

(54) DEVICES AND METHODS FOR DIGITAL ASSISTANT

(71) Applicant: Apple Inc., Cupertino, CA (US)

(72) Inventors: Pravalika Avvaru, Milpitas, CA (US); Novaira Masood, San Jose, CA (US); Jeremy Ray Bernstein, San Francisco, CA (US); Eric Geusz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 17/376,072

(22) Filed: Jul. 14, 2021

Related U.S. Application Data

(60) Provisional application No. 63/052,412, filed on Jul. 15, 2020.

(51) Int. Cl.
*G06F 3/16* (2006.01)
*G06F 3/01* (2006.01)
*G06V 40/20* (2022.01)

(52) U.S. Cl.
CPC ............. *G06F 3/017* (2013.01); *G06F 3/013* (2013.01); *G06F 3/167* (2013.01); *G06V 40/28* (2022.01)

(58) Field of Classification Search
CPC ..... G06F 3/01; G06F 3/16; G06F 3/03; G06F 3/017; G06F 3/013; G06F 3/167; G06V 40/28
See application file for complete search history.

(56) References Cited

U.S. PATENT DOCUMENTS

| | | |
|---|---|---|
| 5,758,122 A | 5/1998 | Corda et al. |
| 8,489,984 B1 | 7/2013 | Violet et al. |
| 9,143,770 B2 | 9/2015 | Bennett et al. |
| 9,318,108 B2 | 4/2016 | Gruber et al. |
| 10,048,748 B2 | 8/2018 | Sridharan et al. |
| 10,452,360 B1 | 10/2019 | Burman et al. |
| 10,521,195 B1 | 12/2019 | Swope et al. |
| 11,119,735 B1 | 9/2021 | Baafi et al. |
| 11,269,889 B1 | 3/2022 | Aversano et al. |
| 2003/0007005 A1 | 1/2003 | Kandogan |
| 2003/0135533 A1 | 7/2003 | Cook |

(Continued)

FOREIGN PATENT DOCUMENTS

WO    2019/026357 A1    2/2019

OTHER PUBLICATIONS

Grzyb et al., "Beyond Robotic Speech: Mutual Benefits to Cognitive Psychology and Artificial Intelligence From the Study of Multimodal Communication", PsyArXiv Preprints, Available online at: <https://psyarxiv.com/h5dxy/>, Feb. 4, 2020, 24 pages.

(Continued)

*Primary Examiner* — Michael A Faragalla
(74) *Attorney, Agent, or Firm* — Kubota & Basol LLP

(57) ABSTRACT

A digital assistant may be used with a computer-generated environment. In some embodiments, a digital assistant is invoked and/or terminated via user input. In some embodiments, the digital assistant is displaying in a computer-generated environment. In some embodiments, the digital assistant may be used to interact with objects in a computer-generated environment. Devices, methods, and graphical user interfaces for a digital assistant provide an improved user experience for computer-generated environments.

21 Claims, 8 Drawing Sheets

(56) References Cited

U.S. PATENT DOCUMENTS

| | | |
|---|---|---|
| 2007/0150864 A1 | 6/2007 | Goh |
| 2007/0238520 A1 | 10/2007 | Kacmarcik |
| 2007/0244847 A1 | 10/2007 | Au |
| 2008/0092111 A1 | 4/2008 | Kinnucan et al. |
| 2012/0259762 A1 | 10/2012 | Tarighat et al. |
| 2014/0072115 A1 | 3/2014 | Makagon et al. |
| 2014/0129961 A1 | 5/2014 | Zubarev et al. |
| 2014/0287397 A1 | 9/2014 | Chong et al. |
| 2015/0077325 A1 | 3/2015 | Ferens et al. |
| 2015/0095882 A1 | 4/2015 | Jaeger et al. |
| 2015/0130716 A1* | 5/2015 | Sridharan ............... G06F 3/017 345/158 |
| 2015/0149912 A1 | 5/2015 | Moore |
| 2016/0026253 A1 | 1/2016 | Bradski et al. |
| 2016/0269508 A1* | 9/2016 | Sharma ............... H04L 63/0884 |
| 2016/0342318 A1 | 11/2016 | Melchner et al. |
| 2016/0379418 A1* | 12/2016 | Osborn ............... G06T 19/20 345/589 |
| 2017/0052767 A1 | 2/2017 | Bennett et al. |
| 2017/0085445 A1 | 3/2017 | Layman et al. |
| 2017/0147296 A1 | 5/2017 | Kumar et al. |
| 2017/0161123 A1 | 6/2017 | Zhao et al. |
| 2017/0255375 A1 | 9/2017 | Kim |
| 2017/0255450 A1 | 9/2017 | Mullins et al. |
| 2017/0277516 A1 | 9/2017 | Grebnov et al. |
| 2017/0315789 A1 | 11/2017 | Lam et al. |
| 2017/0316355 A1 | 11/2017 | Shrestha et al. |
| 2017/0316363 A1 | 11/2017 | Siciliano et al. |
| 2018/0095542 A1* | 4/2018 | Mallinson ............. G06T 19/006 |
| 2018/0107461 A1 | 4/2018 | Balasubramanian et al. |
| 2018/0213048 A1 | 7/2018 | Messner et al. |
| 2018/0285084 A1 | 10/2018 | Mimlitch et al. |
| 2018/0285476 A1 | 10/2018 | Siciliano et al. |
| 2019/0005228 A1 | 1/2019 | Singh et al. |
| 2019/0065026 A1* | 2/2019 | Kiemele ............... A63F 13/92 |
| 2019/0086997 A1 | 3/2019 | Kang et al. |
| 2019/0220863 A1 | 7/2019 | Novick et al. |
| 2020/0225758 A1* | 7/2020 | Tang ..................... G06F 3/012 |
| 2020/0301678 A1 | 9/2020 | Burman et al. |
| 2020/0356350 A1 | 11/2020 | Penland et al. |
| 2021/0152966 A1* | 5/2021 | Mathur ................. H04R 3/005 |
| 2022/0101040 A1 | 3/2022 | Zhang et al. |

OTHER PUBLICATIONS

Hou et al., "Visual Feedback Design and Research of Handheld Mobile Voice Assistant Interface", Atlantis Press, Advances in Intelligent Systems Research, vol. 146, Available online at: <https://download.atlantis-press.com/article/25894195.pdf>, 2018, pp. 174-178.

Ravenet et al., "Automating the Production of Communicative Gestures in Embodied Characters", Frontiers in Psychology, vol. 9, Article 1144, Available online at: <https://www.ncbi.nlm.nih.gov/pmc/articles/PMC6046454/>, Jul. 9, 2018, pp. 1-12.

Non-Final Office Action received for U.S. Appl. No. 17/376,062, mailed on Apr. 21, 2023, 27 pages.

Apaza-Yllachura, et al., "SimpleAR: Augmented Reality High-Level Content Design Framework Using Visual Programming", https://ieeexplore.ieee.org/document/8966427, IEEE, Apr. 9, 2019, 7 pages.

* cited by examiner

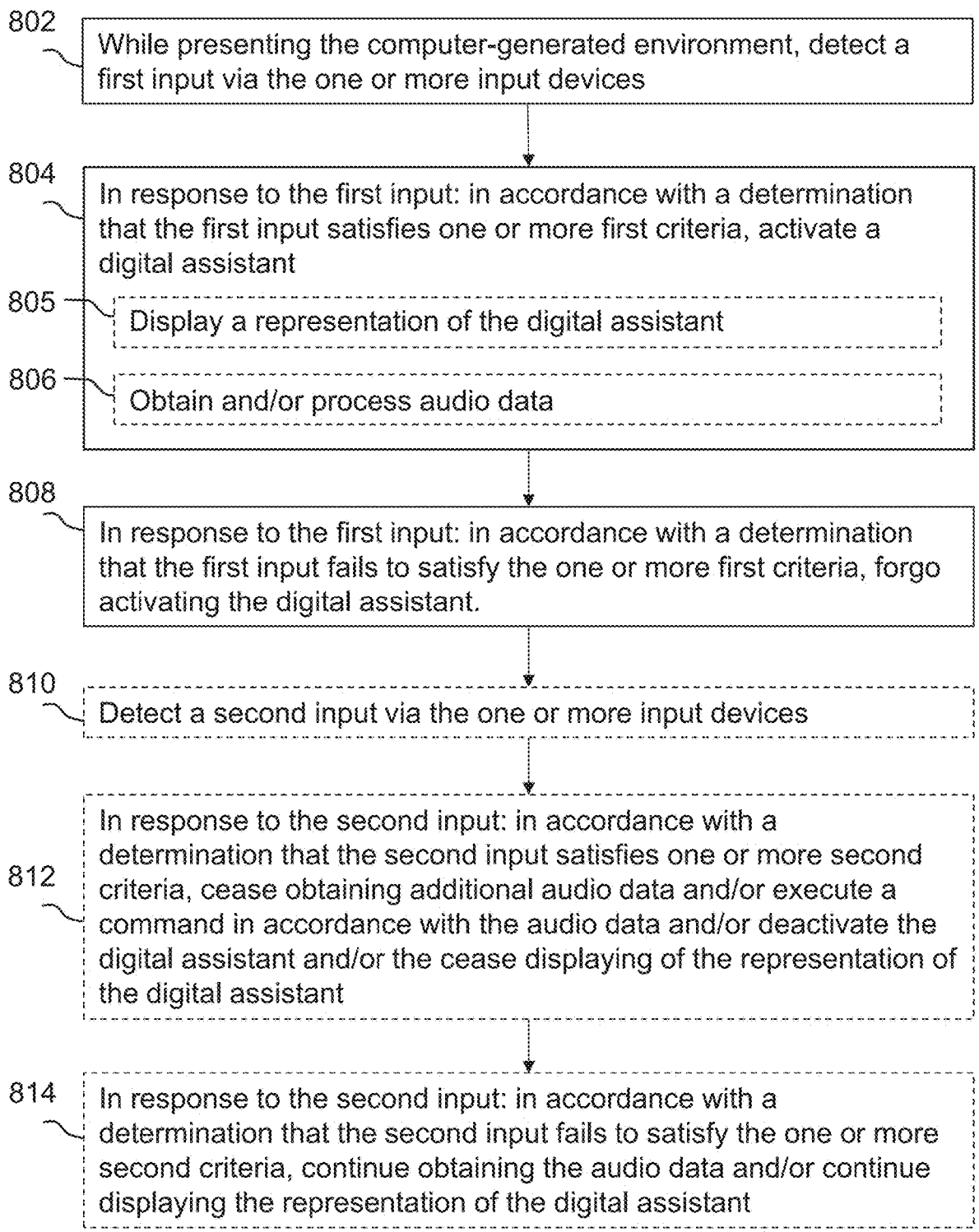

DEVICES AND METHODS FOR DIGITAL ASSISTANT

CROSS-REFERENCE TO RELATED APPLICATIONS

This application claims the benefit of U.S. Provisional Application No. 63/052,412, filed Jul. 15, 2020, the content of which is incorporated herein by reference in its entirety for all purposes.

FIELD OF THE DISCLOSURE

This relates generally to devices, methods, and graphical user interfaces for an electronic digital assistant.

BACKGROUND OF THE DISCLOSURE

Computer-generated environments are environments where at least some objects displayed for a user's viewing are generated using a computer. A user may interact with objects displayed in a computer-generated environment using input devices.

SUMMARY OF THE DISCLOSURE

Some embodiments described in this disclosure are directed to devices, methods, and graphical user interfaces for a digital assistant in a computer-generated environment. Some embodiments described in this disclosure are directed to invoking a digital assistant and/or terminating the digital assistant. Some embodiments described in this disclosure are directed to displaying the digital assistant in a computer-generated environment and/or using the digital assistant to interact with objects in a computer-generated environment. The devices, methods, and graphical user interfaces for a digital assistant provide an improved user experience for computer-generated environments. For example, the digital assistant delivers intuitive and efficient operation in the computer-generated environment. It is understood that this Summary does not limit the scope of the disclosure in any way. Additional descriptions of the embodiments of this disclosure are provided in the Drawings and the Detailed Description that follow.

BRIEF DESCRIPTION OF THE DRAWINGS

FIG. 8 illustrates an example process for a digital assistant in a computer-generated environment in accordance with some embodiments of the disclosure.

DETAILED DESCRIPTION

Figure 1:
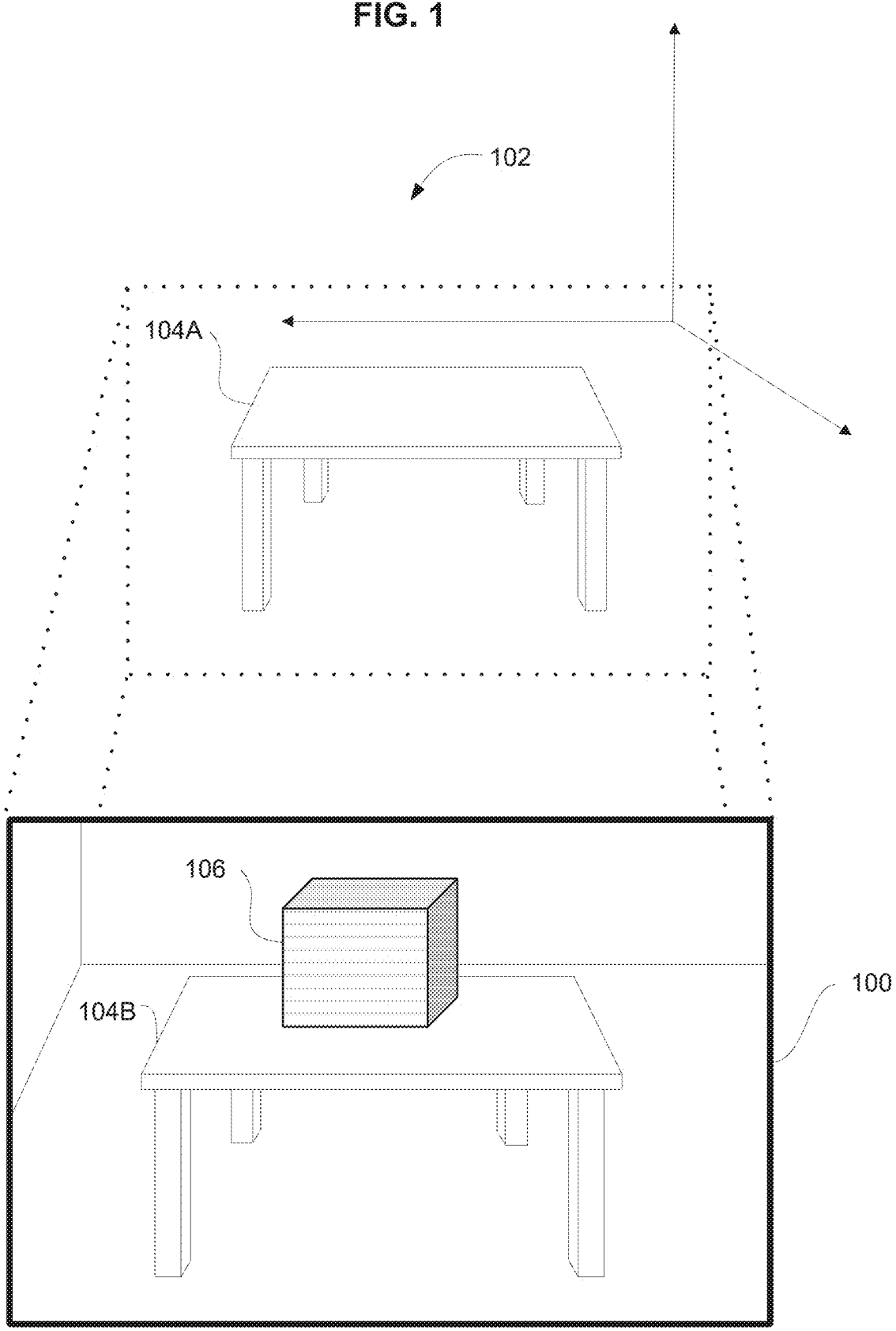
FIG. 1 illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first criterion or first criteria could be termed a second criterion or second criteria, and, similarly, a second criterion or second criteria could be termed a first criterion or first criteria, without departing from the scope of the various described embodiments. The first criterion/criteria and the second criterion/criteria are both criteria, but they are not the same criterion/criteria.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As described herein, the term "if", optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. An XR environment is often referred to herein as a computer-generated environment. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 illustrates an electronic device 100 according to some embodiments of the disclosure. In some embodiments, electronic device 100 is a portable electronic device, such as a tablet computer, laptop computer or a smartphone. Example architectures of electronic device 100 are described below with reference to the block diagrams of FIGS. 2A-2B. FIG. 1 illustrates electronic device 100 and table 104 located in the physical environment 102. In some embodiments, electronic device 100 is configured to capture and/or display areas of physical environment 102 including table 104A (illustrated in the field of view of electronic device 100). In some embodiments, in response to a trigger, the electronic device 100 is configured to display an object 106 in the computer-generated environment that is not present in the physical environment 102, but is displayed in the computer generated environment positioned on or otherwise anchored to the top surface of a computer-generated representation 104B of real-world table 104A. In FIG. 1, for example, object 106 is displayed on the surface of the table 104B in the computer-generated environment displayed via device 100 in response to detecting the planar surface of table 104A in the physical environment 102. It should be understood that although object 106 is represented as a cube in FIG. 1 that object 106 is a representative object and one or more different objects (e.g., of various dimensionality such as two-dimensional or three-dimensional objects) can be included and rendered in a two-dimensional or a three-dimensional computer-generated environment. For example, the object can represent an application or a user interface displayed in the computer-generated environment. Additionally, it should be understood, that the three-dimensional (3D) environment (or 3D object) described herein may be a representation of a 3D environment (or 3D object) displayed in a two dimensional (2D) context (e.g., displayed on a 2D display screen).

Figure 2A:
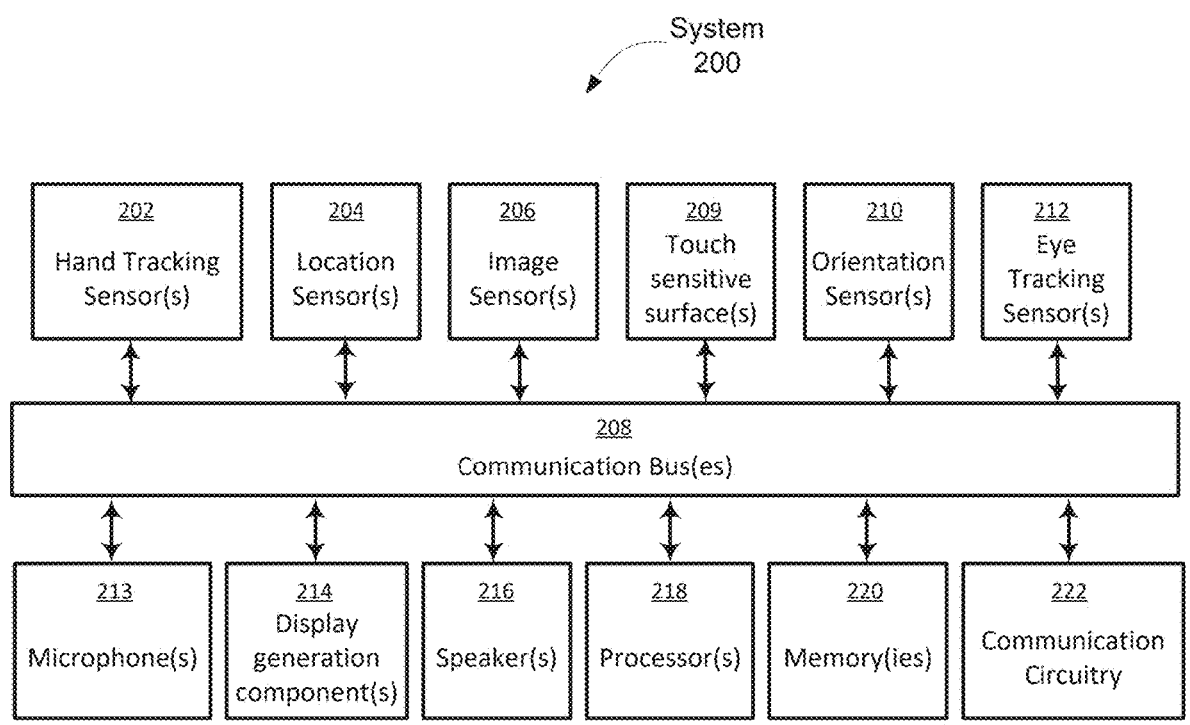
FIGS. 2A-2B illustrate example block diagrams of architectures for a system or device in accordance with some embodiments of the disclosure
Figure 2B:
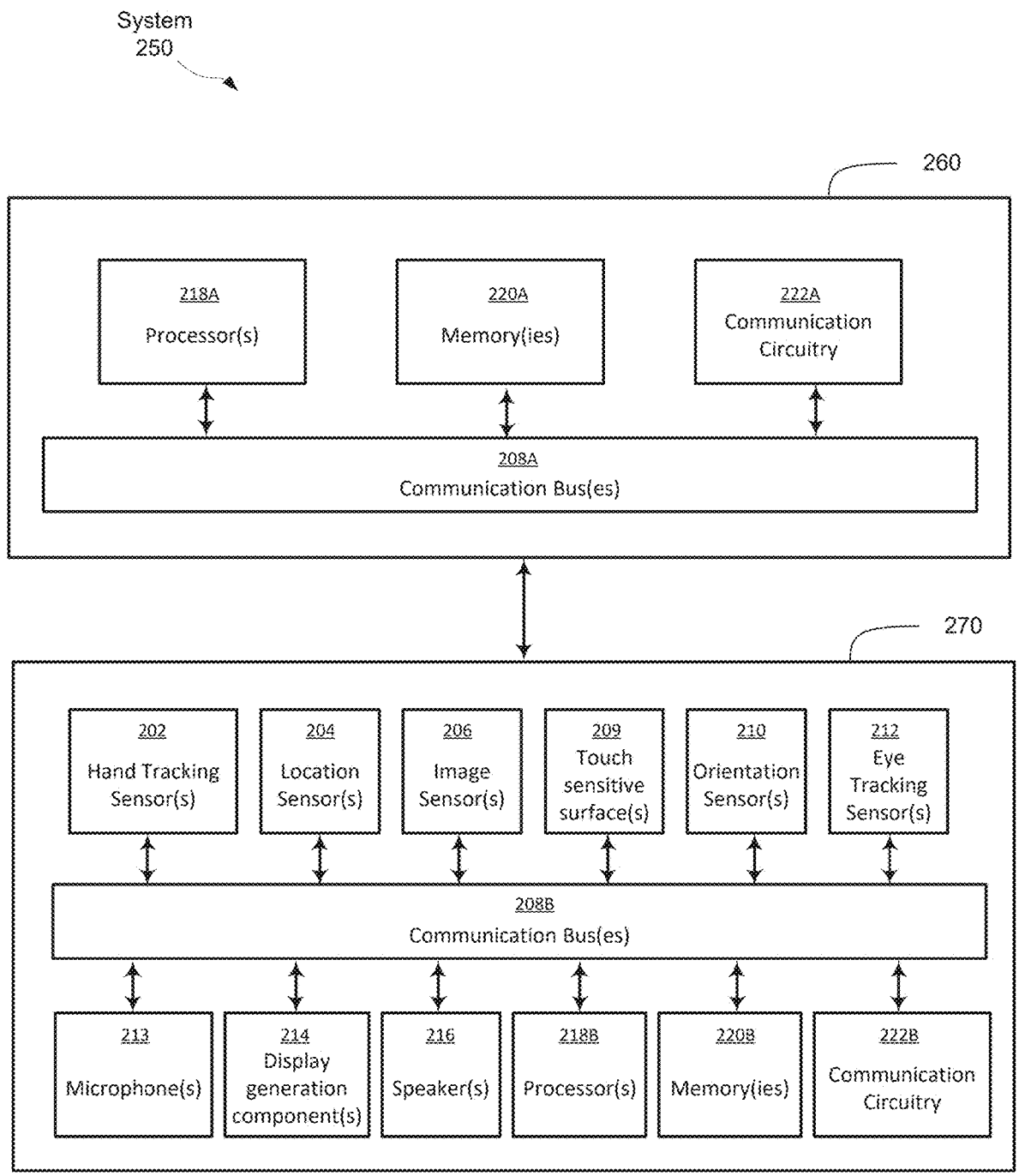

FIGS. 2A-2B illustrate example block diagrams of architectures for a system or device in accordance with some embodiments of the disclosure. In some embodiments, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some embodiments, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some embodiments, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages.

Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some embodiments, display generation component(s) 214 include multiple displays. In some embodiments, display generation component(s) 214 includes a display with a touch-sensitive surface (e.g., a touch screen), a projector, a holographic projector, a retinal projector, etc.

In some embodiments, device 200 includes touch-sensitive surface(s) 209 configured to receive user inputs (touch and/or proximity inputs), such as tap inputs and swipe inputs or other gestures. In some embodiments, display generation component(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 206 include a first image sensor and a second image sensor. The first image sensor and the second image sensor work together and are optionally configured to capture different information of physical objects in the real-world environment. In some embodiments, the first image sensor is a visible light image sensor and the second image sensor is a depth sensor. In some embodiments, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some embodiments, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, or head, more generally) with respect to the real-world or computer-generated environment and/or relative to the display generation component(s) 214. In some embodiments, hand tracking sensor(s) 202 and/or eye tracking sensor(s) 212 are implemented together with the display generation component(s) 214 (e.g., in the same device). In some embodiments, the hand tracking sensor(s) 202 and/or eye tracking sensor(s) 212 are implemented separate from the display generation component(s) 214 (e.g., in a different device).

In some embodiments, the hand tracking sensor(s) 202 uses image sensor(s) 206 (e.g., one or more IR cameras, 3D cameras, depth cameras, etc.) that capture three-dimensional information from the real-world including one or more hands. In some embodiments, the hands can be resolved with sufficient resolution to distinguish fingers and their respective positions. In some embodiments, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and gaze can be determined from tracking both eyes. In some embodiments, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some embodiments, microphone(s) 213 includes an array of microphones that optionally operate together (e.g., to identify ambient noise or to locate the source of sound in space of the real-world environment). In some embodiments, as described in detail herein, microphone(s) 213 or other audio sensor(s) are used to obtain audio data for use with a digital assistant.

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some embodiments, as illustrated in FIG. 2B, system/device 250 can be divided between multiple devices. For example, a first device 260 optionally includes processor(s) 218A, memory or memories 220A, and communication circuitry 222A, optionally communicating over communication bus (es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

A computer-generated environment may be displayed using an electronic device (e.g., electronic device 100, device 200, device 250), including using one or more display generation components. The computer-generated environment can optionally include various graphics user interfaces ("GUIs") and/or user interface objects. As described herein, in some embodiments, a digital assistant is used to provide input to the electronic device. A digital assistant described herein refers to an information processing system that interprets natural language input (e.g., via text or speech) to infer intention of the user, and performs actions based on the inferred user intention. For example, input text or speech can be interpreted by the digital assistant to cause an object to be added to or deleted from the computer-generated environment. In some embodiments, input text or speech can be interpreted by the digital assistant to manipulate (e.g., change position and/or orientation, etc.) or modify the appearance of (e.g., change color, lighting, size, etc.) an object in the computer-generated environment. As such, a digital assistant can be used to improve the user experience and efficiency for interacting with objects within a computer-generated environment, among other possible uses.

In some embodiments, a digital assistant can be invoked or activated using an input device. For example, in some embodiments, one or more audio sensor(s) 213 of device 200/250 (e.g., one or more microphones) can obtain audio input including a trigger expression. Upon detection of the triggering expression, the digital assistant can be invoked. In some embodiments, the digital assistant is invoked via another input device, such as a touch-sensitive surface, a button, a joystick, a motion tracking sensor (e.g., an accelerometer, gyroscope, hand-tracking sensor, eye-tracking sensor, etc.), among other possibilities. In some embodiments, a digital assistant is represented in the computer-generated environment, and the digital assistant is optionally invoked by an input interacting with the representation of the digital assistant in the computer-generated environment.

In some embodiments, invoking/activating a digital assistant optionally includes activating an audio sensor to obtain audio data (or indicating a starting point for an audio input to be processed by the digital assistant). In some embodiments, invoking/activating the digital assistant includes processing audio data (e.g., beginning from a point in time coinciding with the activation). Processing the audio data optionally includes a speech-to-text process in which the audio data is converted to text input, and optionally includes interpreting the speech/text as a natural language input to infer intention of the user. In some embodiments, invoking/activating the digital assistant optionally includes displaying a representation of the digital assistant in the computer-generated environment.

In some embodiments, a digital assistant can be terminated or deactivated using an input device. For example, in some embodiments, one or more audio sensor(s) 213 of device 200/250 can obtain audio input including a termination expression or indicating a threshold period of time elapsed without user speech (e.g., a timeout). Upon detection of the termination expression or threshold period of time without user speech, the digital assistant can be terminated. In some embodiments, the termination of the digital assistant is detected via another input device, such as a touch-sensitive surface, a button, a joystick, a motion tracking sensor (e.g., an accelerometer, gyroscope, hand-tracking sensor, eye-tracking sensor, etc.), among other possibilities. In some embodiments, a digital assistant is represented in the computer-generated environment, and the digital assistant is optionally terminated by an input interacting with (or ceasing interaction with) the representation of the digital assistant.

In some embodiments, terminating/deactivating the digital assistant optionally includes performing an action/executing a command (e.g., adding a new object, manipulating an object, etc.) in accordance with an audio data obtained by the digital assistant. In some embodiments, terminating/deactivating the digital assistant includes ceasing obtaining audio data (or indicating an ending point for an audio input to be processed by the digital assistant). In some embodiments, terminating/deactivating the digital assistant includes ceasing displaying of the representation of the digital assistant.

In some embodiments, a first trigger (e.g., an input satisfying one or more first criteria) and a second trigger (e.g., an input satisfying one or more second criteria) can define boundaries of an audio input to the digital assistant (e.g., defining an activation period of the digital assistant). Audio data collected between the first trigger and the second trigger are processed by the digital assistant. The second trigger can cause the digital assistant to perform an action based on the audio input. In some embodiments, a representation of the digital assistant is displayed in response to the first trigger and/or ceases being displayed in response to the second trigger. In some embodiments, the audio sensors obtain data in response to the first trigger and/or cease obtaining data in response to the second trigger.

Figure 3:
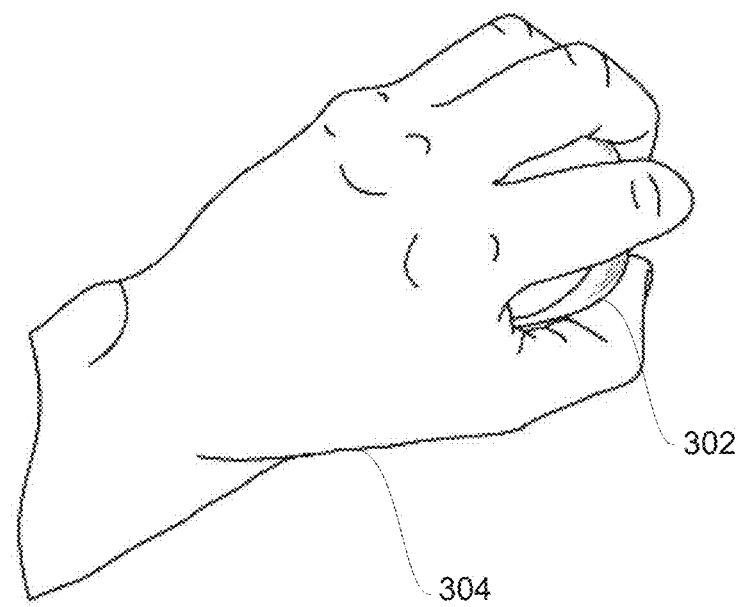
FIG. 3 illustrates an example interaction to activate and/or to deactivate a digital assistant according to some embodiments of the disclosure.

In some embodiments, the first trigger and second trigger involve actuation of a control element. FIG. 3 illustrates an example interaction to activate and/or to deactivate a digital assistant according to some embodiments of the disclosure. For example, FIG. 3 illustrates a control element 302. In some embodiments, control element 302 is an input device than includes a button or force sensor. In some embodiments, an input to activate the digital assistant comprises a hand 304 actuating the button or force sensor (or other sensor) of the control element 302. For example, hand 304 squeezing control element 302 actuates the control element when a threshold amount of force is applied to the force sensor of the control element or when the user depresses the button of the control element. In some embodiments, an input to deactivate the digital assistant comprises de-actuating the button or force sensor (or other sensor) via hand 304. For example, releasing hand 304 or squeezing control element 302 with less than the threshold amount of force or releasing the button of the control element de-actuates the control element. In some embodiments, the input to activate the digital assistant comprises applying the threshold amount of force and then applying less than the threshold amount of force to the force sensor or pressing and releasing the button (e.g., squeezing and releasing control element 302). In some embodiments, the input to deactivate the digital assistant is the same input to activate the digital assistant (e.g., squeezing and then releasing control element 302). In such embodiments, user fatigue may be reduced because the user does not need to apply continuous squeezing force for the duration of time the digital assistant is active.

In some embodiments, control element 302 is a user interface element represented in a computer-generated environment. In some embodiments, control element 302 can be actuated by hand 304 or a representation of a hand 304 displayed in the computer-generated environment (e.g., acquired by the image sensor(s) 206 and/or hand-tracking sensor(s) 202). For example, hand 304 or the representation of hand 304 displayed in the computer-generated environment can squeeze or imitate squeezing the user interface element/control element 302 to activate the digital assistant and release or imitate releasing the user interface element/control element 302 to deactivate the digital assistant. In some embodiments, squeezing and releasing the hand is measured by image sensor(s) 206 and/or hand-tracking sensor(s) 202. In some embodiments, the representation of the digital assistant is anchored to hand 304 or representation of hand 304 in response to and while the hand squeezes or imitates squeezing such that movement of the hand causes movement of the control element 302 in the computer-generated environment. In some embodiments, squeezing and releasing the user interface element/control element 302 activates the digital assistant and again squeezing and releasing the user interface element/control element 302 deactivates the digital assistant (e.g., to reduce user fatigue because the user does not need to apply force/squeezing for the duration of time the digital assistant is active).

Although FIG. 3 illustrates hand 304 squeezing control element 302, it is understood that, in some embodiments, a finger may be used to squeeze a button or apply force to a force sensor of an input device, or that a finger or a representation of the finger can tap or pinch or perform another gesture to interact with the user interface element/control element 302 in the computer-generated environment. In some embodiments, for example, a user may throw the representation of the user interface element/control element 302 upward to activate the digital assistant and the digital assistant is deactivated when the control element returns to its original position in the computer-generated environment (e.g., prior to the user input). In some such embodiments, the velocity of the input and/or the physics of the computer-generated environment dictates a time period during which audio input is obtained. In some embodiments, actuating the user interface element/control element 302 may include directing gaze on the user interface element along with a selection input (e.g., pinching two fingers, pressing a button on a device, etc.) made at a distance from the user interface element representing control element 302.

Figure 4:
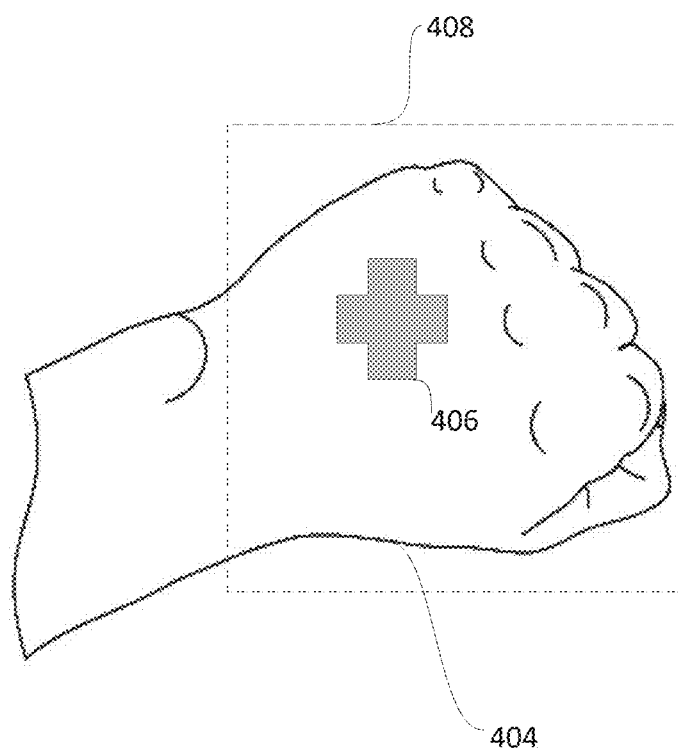
FIG. 4 illustrates an example input to activate a digital assistant according to some embodiments of the disclosure.

FIG. 4 illustrates an example input to activate a digital assistant according to some embodiments of the disclosure. In some embodiments, an input to activate the digital assistant comprise an activation via a hand 404. In some embodiments, in accordance with the input satisfying one or more first criteria, the digital assistant is activated. In some embodiments, in accordance with the input not satisfying the one or more first criteria the digital assistant is not activated. In some embodiments, the one or more first criteria include a pose criterion that is satisfied when the hand is in a predetermined pose (and not satisfied when the hand is not in the predetermined pose). In some embodiments, the one or more first criteria include an orientation criterion that is satisfied when the hand is in a predetermined orientation (and not satisfied when the hand is not in the predetermined orientation). In some embodiments, the one or more first criteria include a position criterion that is satisfied when the hand is in a predetermined position (and not satisfied when the hand is not in the predetermined position). In some embodiments, the one or more first criteria include a hand identity criterion that is satisfied when the hand has a predetermined identity (and not satisfied when the hand is not of the predetermined identity). In some embodiments, all of the above one or more first criteria are required to trigger activation of the digital assistant. In some embodiments, some (a subset) of the above one or more first criteria are required to trigger activation of the digital assistant.

In some embodiments, the predetermined pose may be hand 404 making a first as shown in FIG. 4. In some embodiments, the pose of the hand may be determined using hand-tracking sensor(s) 202 or another input device (e.g., touch profile on an input device). In some embodiments, the predetermined pose may be another pose of the hand different from a fist. In some embodiments, detecting the first may be based on an estimated volume of the hand (e.g., the volume of the hand may be less than a threshold when making a fist). In some embodiments, detecting the first may be based on the position and/or orientation of fingers. For example, adjacent fingers are in contact in a first (e.g., thumb contacts index finger, index finger contacts middle finger, middle finger contacts ring finger, ring finger contacts pinky). As another example, the closing of the first can be detected based on the orientation of the distal, intermediate and proximal phalanges (e.g., intermediate phalanges of at least four fingers are perpendicular (or within a threshold of being perpendicular) in orientation to distal and/or proximal phalanges, and/or the distal and proximate phalanges are parallel (or within a threshold of being parallel) in orientation, etc.).

Figure 5:
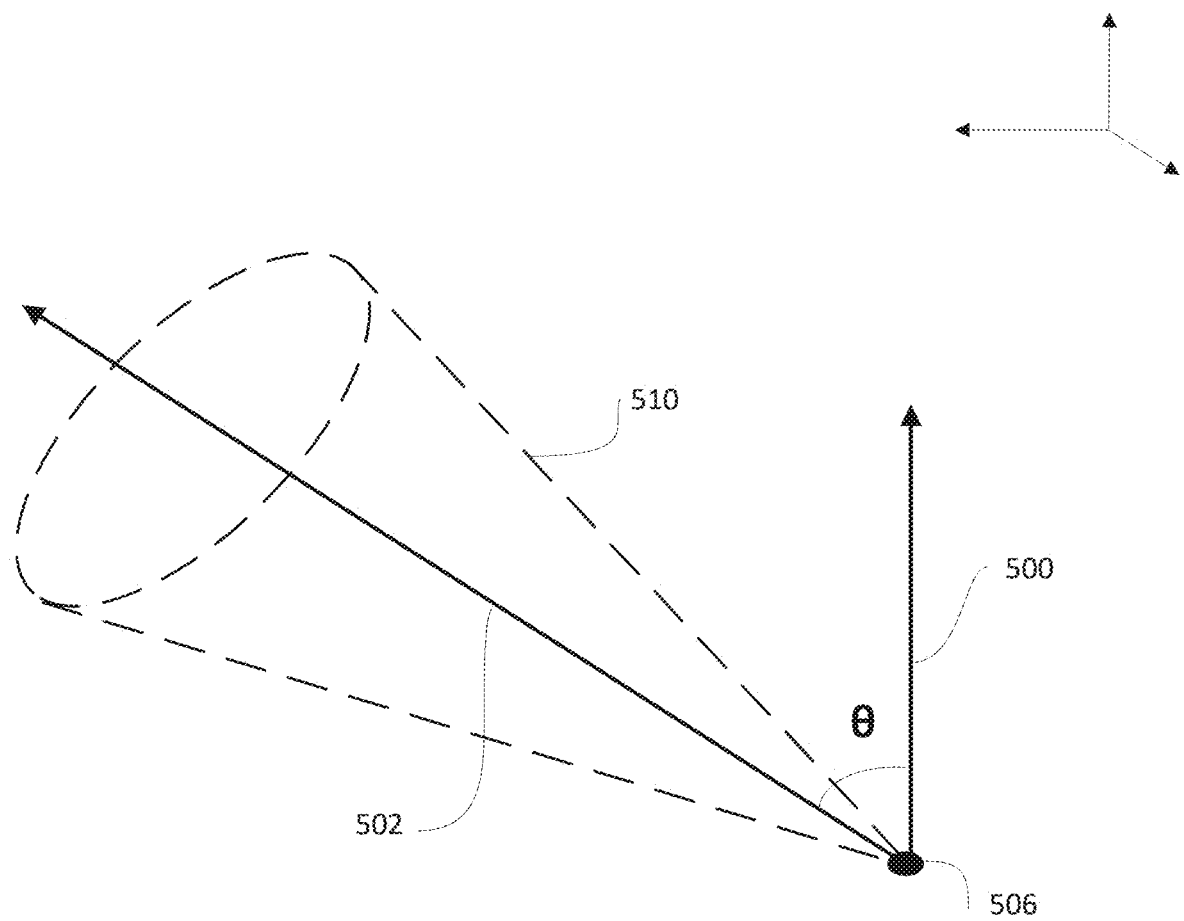
FIG. 5 illustrates an example representation of two vectors according to some embodiments of the disclosure.

In some embodiments, the orientation of the hand may be in a specified direction (or within a threshold of the specified direction) to trigger activation (e.g., corresponding to the back of the hand facing the user's head). In some embodiments, the orientation of the hand may be determined using hand-tracking sensor(s) 202 or another input device (e.g., orientation sensor of an input device held by the user). In some embodiments, the specified direction can be defined relative to a sensor of the device. For example, one or more sensor(s) (e.g., image sensor(s) 210) and/or hand-tracking sensor(s) 202) are used, in some embodiments, to determine an orientation of the hand. For example, two vectors are measured and used to determine an orientation of the hand. FIG. 5 illustrates an example representation of two vectors according to some embodiments of the disclosure. A first vector 500 in FIG. 5 represents a normal vector for a hand (e.g., 404) and a second vector 502 in FIG. 5 represents a vector between a hand and a sensor of the device. For example, the origin of the first vector 500 is at point 506 representing the hand, and the vector is oriented from point 506 outward from the dorsal aspect of the hand (e.g., back of the hand, opposite the palm). In some embodiments, point 506 corresponds to a location on hand 404 represented by indicator 406. The origin of the second vector 502 is at point 506, and the vector is oriented from point 506 toward the device or sensor of the device. In some embodiments, the orientation criterion is satisfied when the first vector 500 is oriented in the same direction as the second vector 502 or within a threshold distance of vector 502, as represented by cone 510 (and is not satisfied when the orientation of the first vector 500 is in a different direction and/or outside the threshold tolerance indicated by cone 510). In some embodiments, the angle between the first vector 500 and the second vector 502 can be computed and the orientation criterion is satisfied when the angle is less than a threshold. In some embodiments, the angle can be computed using the following equation:

$$\theta = \cos^{-1}\frac{\bar{u}\cdot\bar{v}}{\|\bar{u}\|\,\|\bar{v}\|}$$

In some embodiments, the sensor of the device is disposed in proximity to a user's head or eyes, such that satisfying the orientation criterion corresponds to the hand (e.g., the normal of the dorsal aspect) being oriented toward the head or eyes. It should be understood that vector representations of FIG. 5 are representative, and other coordinate systems and/or vectors can be used to determine the relative orientation between the hand and the sensor/device. It should be understood that in some embodiments, the orientation can be determined in other ways. For example, a user may wear an orientation sensor on the hand (e.g., inertial measurement unit) and/or an orientation sensor proximate to the head/eyes (e.g., an inertial measurement unit). The relative orientation may be determined based on the measurements of the orientation sensors.

In some embodiments, the position of the hand may be in a specified region to trigger activation. In some embodiments, to satisfy the position criterion, the hand is within a threshold distance of the user. For example, the length of the second vector 502 may be less than a threshold to trigger the activation. In some embodiments, to satisfy the position criterion, the position of the hand may be within a field of view of one or more sensors (e.g., the one or more image sensor(s) 206, or proximity sensors or hand tracking sensor(s) 202, etc.) or within the field of view (or a predefined interaction area) presented to the user via the display generation component.

In some embodiments, the identity of the hand may be a specified hand (e.g., a predetermined hand) to satisfy the hand identity criterion. For example, in some embodiments, the predetermined pose of a non-dominant hand may activate the digital assistant, whereas the predetermined pose of a dominant hand may not activate the digital assistant. For example, a handedness of the user may be determined (e.g., based on user input designating a dominant hand, and/or based on monitoring the frequency of use of each hand for input to the device), and a left-hand input (but not right-hand input) may activate the digital assistant for a right-hand dominant user, and a right-hand input (but not left-hand input) may activate the digital assistant for a left-hand dominant user. In some embodiment, the digital assistant may be activated by either hand of the user (e.g., independent of the identity of the hand).

In some embodiments, the one or more first criteria optionally include a gaze criterion. For example, in some embodiments, the gaze criterion is satisfied when the user directs gaze at the hand 404, or within a sub-region of the hand (e.g., centered at or around indicator 406), or within a threshold region 408 including hand 404. In some embodiments, the gaze criterion is satisfied when the gaze is directed at hand 404 or a representation of the hand 404 (or a sub-region of the hand or within a threshold region 408) optionally displayed in the computer-generated environment. In some embodiments, the gaze criterion is satisfied when the gaze rests for a threshold period of time on the hand or the designated region including the hand or a sub-region of the hand.

In some embodiments, the one or more first criteria optionally include a timing criterion. The timing criterion is satisfied when some (a subset) or all of the above first criteria are detected for a threshold period of time.

In some embodiments, some or all of the above first criteria are required to initially trigger activation of the digital assistant, but fewer of the above first criteria are required to maintain the activation of the digital assistant. For example, gaze (optionally for a threshold duration) may be required to activate the digital assistant, but the digital assistant can remain activated without maintaining gaze. In some embodiments, the predetermined position and/or orientation of the hand may be required to activate the digital assistant, but the digital assistant can remain activated without maintaining the position and/or orientation of the hand. In some embodiments, fewer of the first criteria may be required to re-activate the digital assistant within a threshold period of time after deactivating the digital assistant (e.g., to make it easier to re-invoke the digital assistant a short period of time after having met the first criteria to invoke the digital assistant).

In some embodiments, while the digital assistant is activated, in accordance with a second input satisfying one or more second criteria, the digital assistant is deactivated. In some embodiments, in accordance with the second input not satisfying the one or more second criteria the digital assistant remains activated (e.g., is not deactivated). In some embodiments, satisfying the one or more second criteria corresponds to failing to satisfy some or all of the one or more first criteria. In some embodiments, the one or more second criteria include a pose criterion that is satisfied when the hand is in a predetermined pose (e.g., releasing a fist, open palm, straightening one or more phalanges, etc.) and not satisfied when the hand is not in the predetermined pose (e.g., maintain the fist). In some embodiments, the one or more second criteria include an orientation criterion that is satisfied when the hand is not in a predetermined orientation (e.g., when the hand fails to satisfy the orientation criterion for the one or more first criteria) and not satisfied when the hand is in the predetermined orientation (e.g., when the hand continues to satisfy the orientation criterion for the one or more first criteria). In some embodiments, the one or more criteria include a position criterion that is satisfied when the hand is in a predetermined position (e.g., within the field of view and/or interaction region) and not satisfied when the hand is not in the predetermined position (e.g., outside the field of view and/or interaction region). In some embodiments, the one or more criteria include an audio criterion that is satisfied when the user ceases speaking for a threshold period of time, or speaks a predefined term or expression indicating the conclusion of the audio input. In other words, the audio criteria is not satisfied while the user continues to speak or avoids speaking the predefined term or expression. In some embodiments, all of the above one or more second criteria are required to trigger deactivation of the digital assistant. In some embodiments, some (a subset) of the above one or more second criteria are required to trigger deactivation of the digital assistant.

Figure 6:
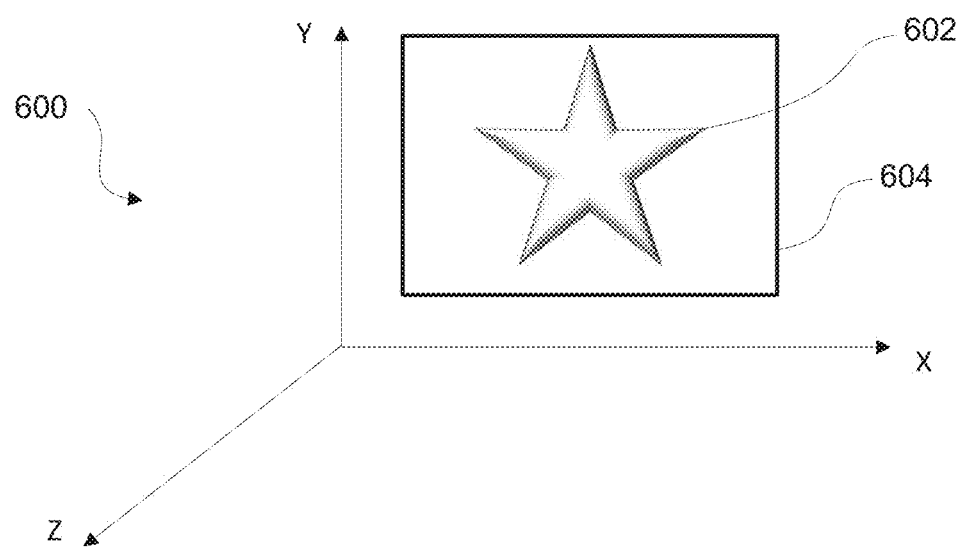
FIG. 6 illustrates a representation of a digital assistant displayed in a computer-generated environment according to some embodiments of the disclosure.

As described herein, in some embodiments, a representation of the digital assistant is displayed in a computer-generated environment (e.g., in response to activating the digital assistant). FIG. 6 illustrates a representation of a digital assistant displayed in a computer-generated environment according to some embodiments of the disclosure. As illustrated in FIG. 6, the representation 602 of a digital assistant, illustrated as a star, is displayed in computer-generated environment 600. Although illustrated as a star, it is understood that the representation 602 of the digital assistant may have a different appearance. Additionally, it is understood that in a three-dimensional computer-generated environment that representation 602 of the digital assistant is optionally a two-dimensional representation or optionally a three-dimensional representation.

In some embodiments, representation 602 of a digital assistant is anchored to a user interface element in the computer-generated environment or a real-world object or a representation of a real-world object in the computer-generated environment. For example, representation 602 of a digital assistant may be displayed anchored to user interface element 604 (e.g., a window, pane or container) in the computer-generated environment. In such embodiments, movement of the user interface element 604 in the computer-generated environment causes movement of the representation 602 of a digital assistant that follows the movement of the user interface element 604. It is understood that although the representation 602 of a digital assistant is illustrated over user interface element 604 that the representation 602 of a digital assistant may be anchored such that it is proximate to (and not necessarily over) the user interface element 604. In some embodiments, the representation 602 of a digital assistant is anchored to a real-world surface (e.g., a planar surface such as a wall or table-top). In some embodiments, a representation of a real-world object includes a representation of a user's hand. In some such embodiments, user interface element 604 comprises the representation of the user's hand, and representation 602 of a digital assistant is displayed anchored to the representation of the user's hand. For example, movement of the user's hand may be tracked (e.g., by hand-tracking sensor(s) 202 and/or image sensor(s) 206), and the display generation component updates the display to move the virtual representation of the digital assistant to track the change in position of the hand or representation of the hand within the computer-generated environment.

In some embodiments, while the representation of a digital assistant is displayed in the computer-generated environment, feedback can be provided to the user to provide an indication of the operation of the digital assistant. For example, while obtaining audio data for the digital assistant, a representation of a digital assistant may change its appearance or enhance its appearance in response to the audio data. In some embodiments, while audio data is being obtained, the size, shape, color, etc. of the representation of the digital assistant can be changed and/or a lighting effect, halo, etc. can be applied to or changed for the representation of the digital assistant. In some embodiments, the changes are in accordance with the audio data. For example, the color or brightness of some or all of the representation of the digital assistant may change based on the amplitude or frequency content of the audio data. In some embodiments, a representation of audio waves may be display on or in proximity to the representation of the digital assistant, and the representation of the audio waves may change based on the changes in the audio data (e.g., in accordance with the amplitude or frequency content of the audio data).

Figure 7:
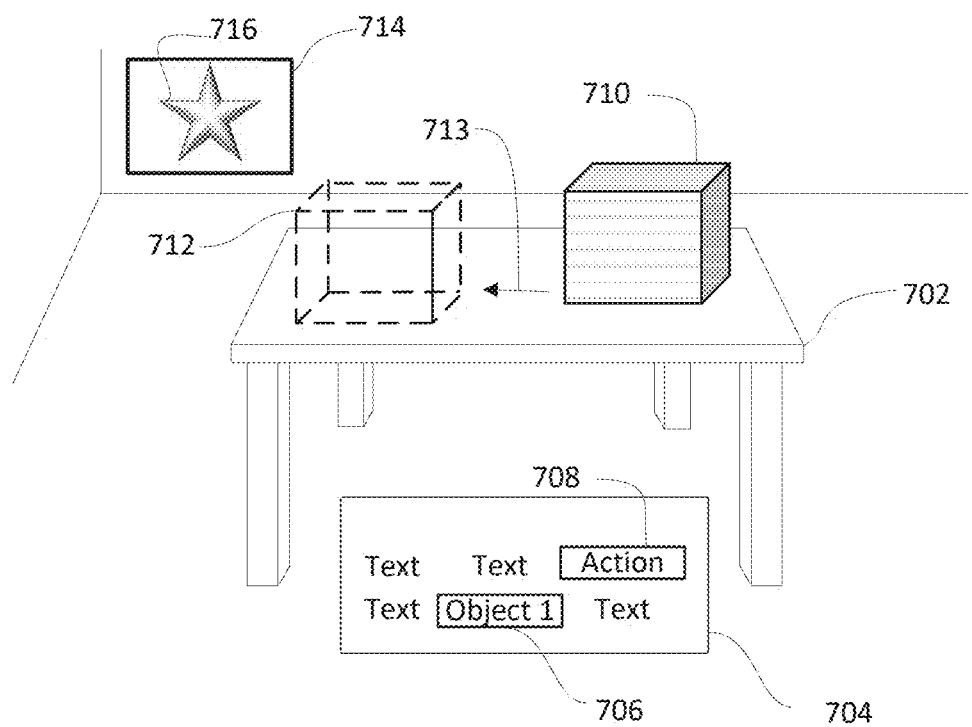
FIG. 7 illustrates a representation of a digital assistant displayed in a computer-generated environment according to some embodiments of the disclosure.

In some embodiments, additional feedback is displayed to the user while using the digital assistant. For example, a text representation of the audio data obtained by the digital assistant and interpreted by the digital assistant is optionally displayed in the computer-generated environment. FIG. 7 illustrates a representation of a digital assistant displayed in a computer-generated environment according to some embodiments of the disclosure. The computer-generated environment of FIG. 7 includes one or more real-world objects, such as table 702 (or representations of one or more real-world objects) and/or one or more computer-generated objects, such as object 710. As described herein, in some embodiments, a representation 716 of the digital assistant (e.g., corresponding to representation 602) is displayed in the computer-generated environment, optionally anchored to a user interface element 714 (e.g., corresponding to user interface element 604) or a real-world surface or a representation of real-world surface.

In some embodiments, while the digital assistant is activated, a text representation of the audio data obtained by and/or interpreted by the digital assistant is displayed in the computer-generated environment as shown by the representation of text in FIG. 7. In some embodiments, the text representation of the audio data is displayed in user interface element 704 (e.g., a window, pane, container, etc.). In some embodiments, text is added to the text representation as the audio data is obtained (e.g., optionally in real-time or near real-time). In some embodiments, the text is displayed with some delay or in response to a trigger (e.g., in response to detecting a pause in a user's speech).

In some embodiments, an appearance of objects (real-world objects, representation of real-world objects, and/or non-real-world objects) in the computer-generated environment that are referenced by the audio data are changed or enhanced. Changing or enhancing the appearance can provide visual context and information about how the digital assistant interprets a user's audio input. For example, the text representation may reference an object, such as "Object 1" shown in the text representation of FIG. 7, and the corresponding object may be identified in the computer-generated environment and have its appearance change or be enhanced. For example, "Object 1" may refer to a real-world object such as table 702 or a representation of table 702 (or object 710), and referencing the table in the audio data may change the appearance of the table (e.g., change its color, shading, shape, shadow, etc.) and/or to add an enhancement (e.g., add a halo or highlighting) as presented by the display generation component. Additionally, in some embodiments, the portion 706 of the text representation corresponding to the object can also have its appearance change (e.g., the text corresponding to "Object 1" may be highlighted or the appearance of the text may be changed to a different font, color, size, or other effects, etc.). In some embodiments, the change in appearance in the text representation of the object and the change in appearance of the object in the computer-generated environment are of the same type or style, or correspond to one another (e.g., use the same color change or highlighting) to provide a visual representation to the user of the correspondence between the text representation and the object in the computer-generated environment.

In some embodiments, a preview of an action to be performed by the digital assistant that is referenced by the audio input (and optionally is displayed in the computer-generated environment in a text representation) is displayed in the computer-generated environment. For example, FIG. 7 illustrates a preview of an audio input to the digital assistant to move object 710 to the left across the surface of the table. A preview of the action is represented in the computer-generated environment by cube 712 in the position to the left and/or by an arrow 713 representing the trajectory of the requested motion. Showing the preview can provide a user with feedback regarding the action to be performed prior to executing the action, optionally allowing the user to cancel the action and/or modify the action prior to digital assistant executing the action.

In some embodiments, a cancelation and/or modification is made by providing additional input. For example, a user can speak a cancelation expression (e.g., "cancel") to cancel performance of the action by the digital assistant. In some embodiments, a cancelation gesture is used to cancel performance of the action by the digital assistant. For example, the hand making the triggering gesture to activate the digital assistant can be covered with the opposite hand to cancel the action and/or deactivate the digital assistant. In some embodiments, a user may use the opposite hand or a finger of the opposite hand to strike through the text in the text representation displayed in the computer-generated environment. As another example, releasing the triggering gesture/pose (e.g., releasing a first) with a threshold movement of the hand (e.g., in a predetermined direction, by a threshold displacement distance, and/or above a predetermined speed) can cancel the action by the digital assistant. For example, mimicking a movement of throwing the contents of the first down (or away from the field of view of the computer-generated environment) with a threshold speed may cancel the action by the digital assistant. In response to the cancelation input, the preview of the action ceases to be displayed in the computer-generated environment. In some embodiments, additional inputs modify the action illustrated by the preview. For example, the user may provide additional audio input to instruct the digital assistant that the object should be moved to a different position and/or in a different direction than shown in the preview, and/or that a different object should be moved, etc. In response to the additional input modifying the action/object request, the preview and/or the text representation may be updated to reflect the modified request.

In some embodiments, the portion 708 of the text representation referring to the action can also have its appearance change (e.g., the text corresponding to "Action" may be highlighted or the text may be in a different font, color, size, or other effects, etc.). In some embodiments, the change in appearance in the text representation of the action and the change in appearance of the computer-generated environment used to display the preview of the action in in the computer-generated environment are of the same type or style, or correspond to one another (e.g., use the same color change or highlighting) to provide a visual representation to the user of the correspondence between the text representation and the object in the computer-generated environment.

It is understood that the audio input and/or text representation may refer to more than one object and/or more than one action. In some embodiments, multiple previews are shown and/or the appearance of multiple objects are changed or enhanced. In some embodiments, different appearances of previews and/or of objects may be different to help a user differentiate between the different actions and/or objects referenced in the audio data. In some embodiments, the appearance of multiple objects that are subject to a common action may be changed or enhanced in a similar manner to provide an indication of the link between the multiple objects despite being different objects. In some embodiments, the action includes adding an object to the computer-generated environment, and the appearance of the preview of the object reflects the appearance of the text representation of the object. In some embodiments, the action includes removing an object to the computer-generated environment, and the appearance of the preview of the object includes fading the appearance of the object (and optionally fading the appearance of the text representation referring to the object).

In some embodiments, changes to the appearance of the objects and/or previews of actions occur as the audio data is obtained (e.g., optionally in real-time or near real-time). In some embodiments, the changes to the appearance and/or preview of actions occur with some delay or in response to a trigger (e.g., in response to detecting a pause in a user's speech).

FIG. 8 illustrates an example process 800 for a digital assistant in a computer-generated environment in accordance with some embodiments of the disclosure. Process 800 is optionally performed at an electronic device such as device 100, device 200 or device 250. Some operations in process 800 are optionally combined and/or optionally omitted. The order of some operations in process 800 is optionally changed, in some embodiments.

In some embodiments, operations of process 800 are performed at an electronic device in communication with a display generation component and one or more input devices. A computer-generated environment is optionally displayed via the display generation component (e.g., display generation component(s) 214). While presenting the computer-generated environment, a first input by a first hand is detected, at 802, via the one or more input devices. At 804, in response to the first input, in accordance with a determination that the first input satisfies one or more first criteria, the one or more first criteria include at least one criterion regarding a characteristic of the hand (e.g., position, pose, orientation, identity), the electronic device activates a digital assistant. At 808, in response to the first input, in accordance with a determination that the first input fails to satisfy the one or more first criteria, the electronic device forgoes activating a digital assistant (though the electronic device may still display of a representation of the hand).

Additionally or alternatively to one or more of the embodiments disclosed above, in some embodiments, in response to the first input, in accordance with a determination that the first input satisfies the one or more first criteria, the electronic device, at 805, displays a representation of the digital assistant in the computer-generated environment. Additionally or alternatively to one or more of the embodiments disclosed above, in some embodiments, the electronic device displays, via the display generation component, a representation of the hand in the computer-generated environment. Additionally or alternatively to one or more of the embodiments disclosed above, in some embodiments, the representation of the digital assistant in the computer-generated environment is anchored to the representation of the hand in the computer-generated environment.

Additionally or alternatively to one or more of the embodiments disclosed above, in some embodiments, the one or more first criteria include a criterion that is satisfied when the hand corresponds to a predetermined hand. Additionally or alternatively to one or more of the embodiments disclosed above, in some embodiments, the one or more first criteria include a criterion that is satisfied when the hand is in a predetermined pose. Additionally or alternatively to one or more of the embodiments disclosed above, in some embodiments, the predetermined pose is a fist. Additionally or alternatively to one or more of the embodiments disclosed above, in some embodiments, the one or more first criteria include a criterion that is satisfied when the hand is oriented in a specified direction or within a threshold of the specified direction. Additionally or alternatively to one or more of the embodiments disclosed above, in some embodiments, the one or more first criteria include a criterion that is satisfied when the hand is within a field of view of a sensor of the electronic device. Additionally or alternatively to one or more of the embodiments disclosed above, in some embodiments, the one or more first criteria include a criterion that is satisfied when a gaze is detected at or within a threshold distance of the hand or a representation of the hand in the computer-generated environment. Additionally or alternatively to one or more of the embodiments disclosed above, in some embodiments, the one or more first criteria include a criterion that is satisfied when a subset of the one or more first criteria are satisfied for a threshold period of time.

Additionally or alternatively to one or more of the embodiments disclosed above, in some embodiments, in response to the first input, in accordance with a determination that the first input satisfies the one or more first criteria, the electronic device, at 806, obtains audio data via an audio sensor. Additionally or alternatively to one or more of the embodiments disclosed above, in some embodiments, while displaying the representation of the digital assistant in the computer-generated environment, the electronic device changes an appearance of the representation of the digital assistant in accordance with audio data acquired while the digital assistant is activated.

Additionally or alternatively to one or more of the embodiments disclosed above, in some embodiments, while the digital assistant is activated and while displaying the computer-generated environment, the electronic device detects, at 810, via the one or more input devices, a second input. In response to the second input: at 812, in accordance with a determination that the second input satisfies one or more second criteria, the electronic device ceases obtaining additional audio data and/or the electronic device executes a command in accordance with the audio data and/or the electronic device deactivates the digital assistant and/or the electronic device ceases displaying of the representation of the digital assistant. In response to the second input, at 814, in accordance with a determination that the second input fails to satisfy the one or more second criteria, the electronic device continues obtaining the audio data and/or continues displaying the representation of the digital assistant.

Additionally or alternatively to one or more of the embodiments disclosed above, in some embodiments, the command comprises adding a new object or manipulating an existing object in the computer-generated environment. In some such embodiments, the electronic device adds the new object or manipulating the new object in accordance with executing the command.

Additionally or alternatively to one or more of the embodiments disclosed above, in some embodiments, the one or more second criteria include a criterion that is satisfied when the hand is in a predetermined pose. Additionally or alternatively to one or more of the embodiments disclosed above, in some embodiments, the predetermined pose corresponds to releasing a first or an open palm. Additionally or alternatively to one or more of the embodiments disclosed above, in some embodiments, the one or more second criteria include a criterion that is satisfied when the hand is not oriented in a specified direction or within a threshold of the specified direction. Additionally or alternatively to one or more of the embodiments disclosed above, in some embodiments, the one or more second criteria include a criterion that is satisfied when the audio data indicate a user ceases to speak for a threshold period of time. Additionally or alternatively to one or more of the embodiments disclosed above, in some embodiments, the one or more second criteria include a criterion that is satisfied when the audio data indicate a predefined audio command.

Additionally or alternatively to one or more of the embodiments disclosed above, in some embodiments, while the digital assistant is activated and while displaying the computer-generated environment, the electronic device detects, via the one or more input devices, audio data. In response to the audio data: the electronic device displays a representation of the audio data in the computer-generated environment. Additionally or alternatively to one or more of the embodiments disclosed above, in some embodiments, the representation of the audio data comprises a text representation of the audio data. Additionally or alternatively to one or more of the embodiments disclosed above, in some embodiments, the representation of the audio data comprises changing an appearance of an object displayed in the computer-generated environment that is referenced by the audio data. Additionally or alternatively to one or more of the embodiments disclosed above, in some embodiments, while displaying the computer-generated environment including the representation of the audio data, detecting, via the one or more input devices, a second input. In accordance with a determination that the second input satisfies one or more second criteria, the electronic device ceases displaying the representation of the audio data in the computer-generated environment. In response to the second input: in accordance with a determination that the second input fails to satisfy the one or more second criteria, the electronic device continues displaying the representation of the audio data in the computer-generated environment.

Additionally or alternatively to one or more of the embodiments disclosed above, in some embodiments, while the digital assistant is activated and while displaying the computer-generated environment, the electronic device detects, via the one or more input devices, a second input. In accordance with a determination that the second input satisfies a specified subset of the one or more first criteria, the electronic device maintains activation of the digital assistant and continues obtaining the audio data. In accordance with a determination that the second input fails to satisfy the specified subset of the one or more criteria, the electronic device deactivates the digital assistant, executes a command in accordance with the audio data, ceases obtaining additional audio data, and/or ceases displaying of the representation of the digital assistant.

It should be understood that the particular order of the description of the operations in FIG. 8 is merely exemplary and is not intended to indicate that the described order is the only order in which the operations could be performed. One of ordinary skill in the art would recognize various ways to reorder the operations described herein.

The operations of process described above are, optionally, implemented by an electronic device comprising: one or more processors; memory; and one or more programs stored in the memory. The one or more programs stored in the memory and configured to be executed by the one or more processors, cause the processor to perform any of the above operations. The operations of process described above are, optionally, implemented by a storing one or more programs. The one or more programs stored in the non-transitory computer readable storage medium and configured to be executed by the one or more processors of an electronic device, cause the processor to perform any of the above operations.

The operations of process described above are, optionally, implemented by running one or more functional modules in an information processing apparatus such as general-purpose processors (e.g., as described with respect to FIGS. 2A-2B) or application specific chips. Further, the operations described above with reference to FIG. 8 are, optionally, implemented by components depicted in FIGS. 2A-2B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
 at an electronic device in communication with a display and one or more input devices comprising at least one hand-tracking sensor:
  displaying, via the display, a three-dimensional environment;
  while displaying the three-dimensional environment, detecting, via the at least one hand-tracking sensor, a first input including a gesture by a hand; and
  in response to the first input:
   in accordance with a determination that the first input satisfies first criteria, the first criteria including a first criterion that is satisfied when the hand is oriented in a specified direction relative to the electronic device or within a threshold of the specified direction relative to the electronic device, when a dorsal aspect of the hand is facing the electronic device and including a second criterion that is satisfied when a gaze is detected at or within a threshold distance of the hand or a representation of the hand in the three-dimensional environment, activating a digital assistant and displaying a visual representation of the digital assistant in the three-dimensional environment, wherein;
    the digital assistant interprets natural language input and performs one or more actions based on the natural language input; and
    in accordance with a determination that the digital assistant is activated:
     obtaining audio data; and
     changing the visual representation of the digital assistant based on the audio data while obtaining the audio data; and
   in accordance with a determination that the first input fails to satisfy the first criteria, forgoing activating the digital assistant.

2. The method of claim 1, further comprising: while the digital assistant is activated and while displaying the three-dimensional environment, detecting, via the one or more input devices, a second input; and in response to the second input: in accordance with a determination that the second input satisfies one or more second criteria, ceasing displaying of the visual representation of the digital assistant; and in accordance with a determination that the second input fails to satisfy the one or more second criteria, continuing displaying the visual representation of the digital assistant.

3. The method of claim 1, wherein the visual representation of the digital assistant in the three-dimensional environment is anchored to a representation of the hand in the three-dimensional environment.

4. The method of claim 1, wherein the first criteria include one or more of: a criterion that is satisfied when the hand corresponds to a predetermined hand; a criterion that is satisfied when the hand is in a predetermined pose; a criterion that is satisfied when the hand is orientated in a specified direction or within a threshold of the specified direction; or a criterion that is satisfied when the hand is within a field of view of a sensor of the electronic device.

5. The method of claim 1, wherein the first criteria include a criterion that is satisfied when a gaze is detected at or within a threshold distance of the hand or a representation of the hand in the three-dimensional environment.

6. The method of claim 1, wherein the first criteria include a criterion that is satisfied when a subset of the first criteria are satisfied for a threshold period of time.

7. The method of claim 1, further comprising: while the digital assistant is activated and while displaying the three-dimensional environment, detecting, via the one or more input devices, audio data; and in response to the audio data: displaying a representation of the audio data in the three-dimensional environment.

8. An electronic device comprising: a display; one or more input devices comprising at least one hand-tracking sensor; one or more processors; memory; and one or more programs stored in the memory and configured to be executed by the one or more processors, the one or more programs including instructions for: displaying, via the display, a three-dimensional environment; while displaying the three-dimensional environment, detecting, via the at least one hand-tracking sensor a first input including a gesture by a hand; and in response to the first input: in accordance with a determination that the first input satisfies first criteria, the first criteria including a criterion that is satisfied when the hand is oriented in a specified direction relative to the electronic device or within a threshold of the specified direction relative to the electronic device, when a dorsal aspect of the hand is facing the electronic device and a criterion that is satisfied when a gaze is detected at or within a threshold distance of the hand or a representation of the hand in the three-dimensional environment, activating a digital assistant and displaying a visual representation of the digital assistant in the three-dimensional environment, wherein:
 the digital assistant interprets natural language input and performs one or more actions based on the natural language input; and
 in accordance with a determination that a digital assistant is activated:
  obtaining audio data; and
  changing the visual representation of the digital assistant based on the audio data while obtaining the audio data; and in accordance with a determination that the first input fails to satisfy the first criteria, forgoing activating the digital assistant.

9. A non-transitory computer readable storage medium storing one or more programs, the one or more programs comprising instructions, which when executed by one or more processors of an electronic device, cause the electronic device to perform a method comprising:
displaying, via a display, a three-dimensional environment; while displaying the three-dimensional environment, detect, via one or more input devices comprising at least one hand-tracking sensor, a first input including a gesture by a hand; and in response to the first input: in accordance with a determination that the first input satisfies first criteria, the first criteria including a criterion that is satisfied when the hand is oriented in a specified direction relative to the electronic device or within a threshold of the specified direction relative to the electronic device, when a dorsal aspect of the hand is facing the electronic device and a criterion that is satisfied when a gaze is detected at or within a threshold distance of the hand or a representation of the hand in the three-dimensional environment, activating a digital assistant and displaying a visual representation of the digital assistant in the three-dimensional environment, wherein:
the digital assistant interprets natural language input and performs one or more actions based on the natural language input; and
in accordance with a determination that a digital assistant is activated:
obtaining audio data; and
changing the visual representation of the digital assistant based on the audio data while obtaining the audio data; and
in accordance with a determination that the first input fails to satisfy the first criteria, forgoing activating the digital assistant.

10. The electronic device of claim 8, the one or more programs further including instructions for: while the digital assistant is activated and while displaying the three-dimensional environment, detecting, via the one or more input devices, a second input; and in response to the second input: in accordance with a determination that the second input satisfies one or more second criteria, ceasing displaying of the visual representation of the digital assistant; and in accordance with a determination that the second input fails to satisfy the one or more second criteria, continuing displaying the visual representation of the digital assistant.

11. The electronic device of claim 8, wherein the visual representation of the digital assistant in the three-dimensional environment is anchored to a representation of the hand in the three-dimensional environment.

12. The electronic device of claim 8, wherein the digital assistant interprets natural language input and performs one or more actions based on the natural language input.

13. The electronic device of claim 8, wherein the first criteria include one or more of: a criterion that is satisfied when the hand corresponds to a predetermined hand; a criterion that is satisfied when the hand is in a predetermined pose; a criterion that is satisfied when a gaze is detected at or within a threshold distance of the hand or a representation of the hand in the three-dimensional environment; or a criterion that is satisfied when the hand is within a field of view of a sensor of the electronic device.

14. The electronic device of claim 8, the one or more programs further including instructions for: in response to the first input: in accordance with the determination that the first input satisfies the first criteria, obtaining audio data via an audio sensor; while the digital assistant is activated and while displaying the three-dimensional environment, detecting, via the one or more input devices, a second input; and in response to the second input: in accordance with a determination that the second input satisfies one or more second criteria, ceasing obtaining additional audio data; and in accordance with a determination that the second input fails to satisfy the one or more second criteria, continuing obtaining the audio data.

15. The electronic device of claim 14, wherein the one or more second criteria include one or more of: a criterion that is satisfied when the hand is in a predetermined pose; a criterion that is satisfied when the hand is not oriented in a specified direction or within a threshold of the specified direction; a criterion that is satisfied when the audio data indicate a user ceases to speak for a threshold period of time; or a criterion that is satisfied when the audio data indicate a predefined audio command.

16. The electronic device of claim 14, the one or more programs further including instructions for: in response to the first input: in accordance with the determination that the first input satisfies the first criteria, obtaining audio data via an audio sensor while the digital assistant is activated and while displaying the three-dimensional environment, detecting, via the one or more input devices, a second input; and in response to the second input: in accordance with a determination that the second input satisfies one or more second criteria, executing a command in accordance with the audio data; and in accordance with a determination that the second input fails to satisfy the one or more second criteria, continuing obtaining the audio data.

17. The electronic device of claim 16, wherein the command comprises adding a new object or manipulating an existing object in the three-dimensional environment, the one or more programs further including instructions for: adding the new object or manipulating the existing object in accordance with executing the command.

18. The non-transitory computer readable storage medium of claim 9, the method further comprising: while the digital assistant is activated and while displaying the three-dimensional environment, detecting, via the one or more input devices, a second input; and in response to the second input: in accordance with a determination that the second input satisfies one or more second criteria, deactivating the digital assistant; and in accordance with a determination that the second input fails to satisfy the one or more second criteria, continuing obtaining audio data.

19. The non-transitory computer readable storage medium of claim 9, wherein the first criteria include one or more of: a criterion that is satisfied when the hand corresponds to a predetermined hand; a criterion that is satisfied when the hand is in a predetermined pose; a criterion that is satisfied when the hand is orientated in a specified direction or within a threshold of the specified direction; a criterion that is satisfied when the hand is within a field of view of a sensor of the electronic device; or a criterion that is satisfied when a subset of the first criteria are satisfied for a threshold period of time.

20. The non-transitory computer readable storage medium of claim 9, wherein the digital assistant interprets natural language input and performs one or more actions based on the natural language input.

21. The method of claim 1, wherein the first criteria include a criterion that is satisfied when the gesture by the hand includes a predetermined pose, wherein the predetermined pose corresponds to the hand in a fist.

* * * * *